United States Patent Office 3,432,715
Patented Mar. 11, 1969

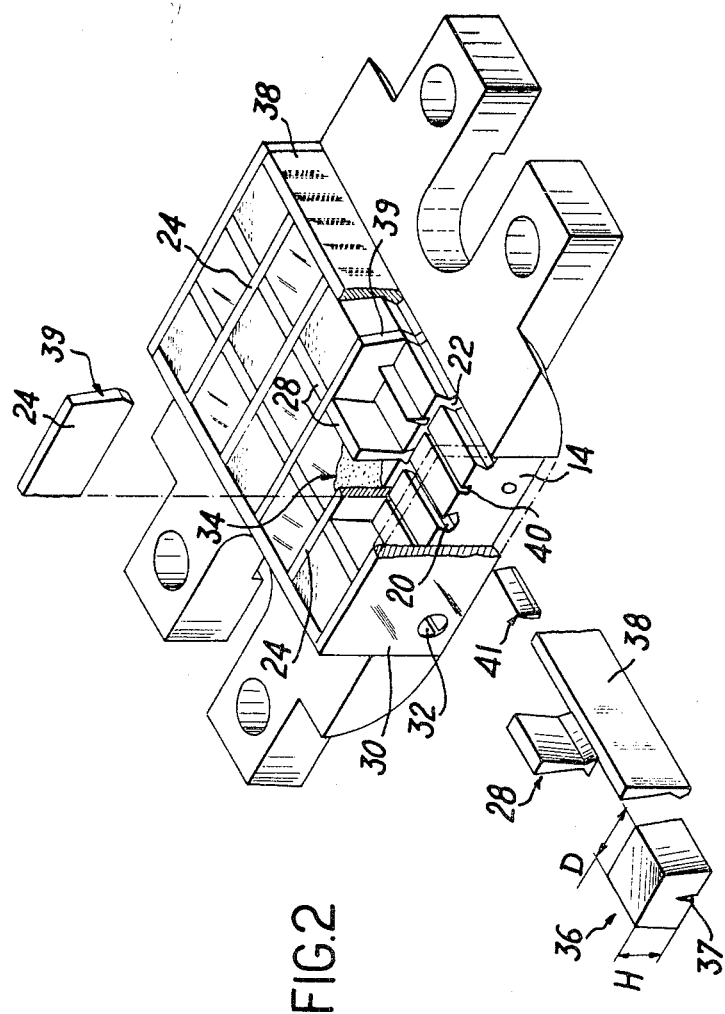

3,432,715
COMPOSITE ELECTRODE FOR MHD CONVERSION DUCT
David Yerouchalmi, Issy-les-Moulineaux, France, assignor to Commissariat à l'Energie Atomique, Paris, France
Filed Mar. 13, 1967, Ser. No. 622,503
Claims priority, application France, Mar. 22, 1966, 54,572
U.S. Cl. 313—346
Int. Cl. H01j 1/14
7 Claims

ABSTRACT OF THE DISCLOSURE

The composite electrode comprises on the one hand a casing formed of heat-conducting material which is maintained at a low temperature and provided on one face with a partition structure forming recesses and on the other hand bricks formed of ceramic material, said bricks being attached to said casing by means of metallic elements which permit the flow of electric current from the frontal face of the electrode to the casing.

---

This invention relates to a composite electrode for MHD conversion ducts. Some MHD power generators which operate on the open-cycle principle comprise a duct of rectangular cross-section in which the combustion gases which are heated to 2,700–3,000° K. either by superoxidation or by addition of secondary air at high temperature are ionized by seeding with an alkali metal and thus acquire an electrical conductivity of the order of 10 to 40 mhos/meter. These seeded gases circulate at velocities of approximately 700–800 m./s. in an intense magnetic field (higher than 2 Teslas) produced at right angles to two of the conversion duct walls which are located opposite to each other and which must provide electric insulation. Thus, said gases become the source of an electric current which is substantially perpendicular to the direction of their displacement as well as to the direction of the magnetic field, in accordance with Laplace's law. The current thus generated can be collected in an external load circuit, provided that the two remaining and opposite walls of the duct are electrically conductive and that the electrical contact between the hot seeded gases and the frontal face of the electrode does not result in any appreciable voltage drop.

Such a quality of electrical contact can be ensured only on condition that the gaseous boundary layer between the conductive wall referred-to as the MHD electrode and the circulating gases is brought to a high temperature, that is to say on condition that the electrode itself has a very hot surface. In order to maintain a frontal electrode face at a high temperature, it is necessary among other things to ensure that, for a given state of MHD operation, the passage of thermal flux through the wall of said electrode is blocked by a suitable heat insulation. Such insulation can also be designed to determine the temperature of the frontal electrode face irrespective of the thermal state of the conversion duct.

In practice, it proves necessary to operate with frontal electrode-face temperatures of the order of 1,900–2,000° K., firstly in order to permit the utilization of certain structural materials with a sufficient safety margin of pyroscopic resistance and corrosion resistance and, secondly, in order to operate with the four walls of the MHD conversion duct at the same temperature so as to prevent perturbations of flow of the seeded gases. Indeed, it proves essential to maintain the temperature of the electrically insulating walls between 1,900 and 2,000° K. by reason of the fact that, above this range, there are no structural materials which afford sufficient insulation under MHD conditions (electrical conductivity of insulators of less than 5 mhos/meter) and short circuits across the walls then become extremely troublesome. Below this range, the dew point or point of liquefaction of the alkali metals is nearly attained and the same dangers of short-circuits arise as a result of deposition of seeding material on the walls which are in such a case insufficiently hot.

In order to maintain the frontal faces of the ceramic structures at 1,900°–2,000° K. while gases circulate in the MHD conversion duct at temperatures of 2,700 to 3,000° K. and velocities of the order of 700 to 800 meters per second, it is evidently essential to cool the structure which serves as a backing for the ceramic elements (and the thickness of which will depend on the heat conductivity of said elements and on the thermal flux which has to be removed by these latter), cooling being usually effected by a stream of water having a temperature of the order of 350° K.

Controlled cooling of the backing structure against which the ceramic elements are placed is obtained by fixing these latter either by mechanical clamping, ceramic-to-metal brazing or both on a cooled copper casing.

If, by way of nonlimitative example, the ceramic material employed is of electrically conductive zirconium oxides, calculation shows that, in the case of a thermal flux of 60 to 70 watts/cm.$^2$ (experimental duct), the thickness of the ceramic material is approximately 10 millimeters. Thus, it is possible to construct ceramic walls by making use of sintered monolithic parts having this thickness. However, the thickness is reduced to 1–1.5 mm. when the flux is 400 to 500 watts/cm.$^2$ (industrial duct having a thermal power rating of 500 mw.). And it is apparent that, in order to ensure that parts fabricated of high-density ceramic material should have sufficient mechanical strength to permit a service life of several hundred hours, it would clearly not be feasible to contemplate thicknesses of the order of 1 to 1.5 millimeters. The present invention is directed to the design concept of a composite electrode which meets practical requirements more effectively than those employed in the prior art, especially insofar as said electrode satisfies the different conditions mentioned in the foregoing, particularly from the point of view of resistance to thermal shock and high heat-removal capacity, thereby making it possible to maintain a sufficiently low temperature at the frontal face.

To this end, the invention proposes an electrode which comprises on the one hand a casing formed of heat-conducting material which is maintained at low temperature and provided on one face with a partition structure forming recesses and, on the other hand, bricks fabricated of high-density ceramic material which are fitted in said recesses, said bricks being attached to said casing by means of metallic elements which permit the flow of electric current from the frontal face of the electrode to the metallic casing.

In a preferred form of execution of the invention, the partition structure is constituted by partition elements and cross-pieces which are separated by said parition elements and disposed at right angles thereto, said cross-pieces being anchored in the casing and having a cross-section of progressively increasing width towards the frontal face in order to retain the bricks.

The invention further consists in other arrangements which are preferably employed in conjunction with those previously referred-to but which can also be employed separately. All of these arrangements will become more readily apparent from the following description of modes of execution of the invention which are given by way of example and not in any limiting sense. Reference is had to the accompanying drawings, in which:

FIG. 2 is a partially exploded view in perspective of the electrode shown in FIG. 1;

Figure 1:
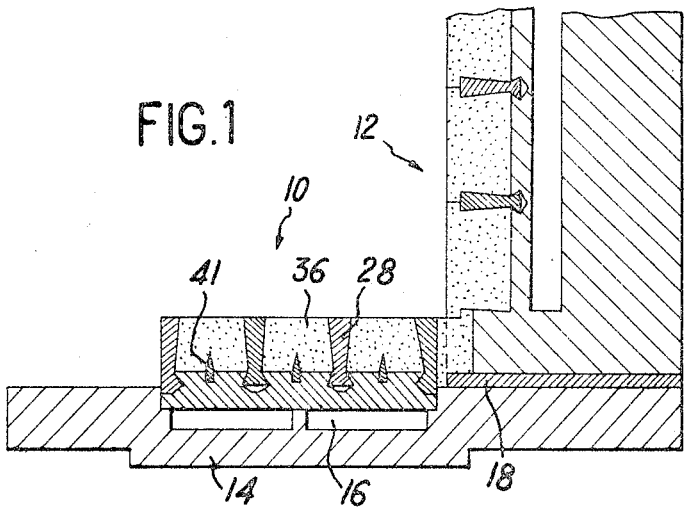
FIG. 1 is a partial view of a conversion duct provided with an electrode according to the invention and shown in cross section along a plane at right angles to the direction of flow.

FIG. 1 shows a portion of a MHD conversion duct as shown in cross section transversely to the direction of flow of the gases. Said duct comprises two opposite electrodes, of which only the electrode 10 is shown, and two insulating walls also in opposite relation, only one wall 12 being partially shown in the figure. The insulating wall is of the type described in the copending patent application Ser. No. 620,953 filed on Mar. 6, 1967 in the name of the present applicant in respect of "Electrically Insulating Wall." The electrode 10 which is shown in perspective in FIG. 2 comprises a casing 14 of conductive material (such as copper, for example) in which is formed a conduit 16 (shown in FIG. 1) through which cooling water is circulated. Insulating strips 18 fabricated of ceramic material, for example, are interposed between the insulating wall 12 and the casing 14 of the electrode 10.

There are cut in the frontal face of the casing 14 two series of grooves 20 and 22 for receiving a partition structure and located at right angles. The grooves 20 which are parallel to the direction of flow of gases have a dovetailed cross section. On the contrary, the grooves 22, which are orthogonal to the grooves 20, have a rectangular cross section. Partition elements 24 having parallel faces are adapted to engage in the grooves 22 and the lateral edges 39 of said elements are brought to bear against the two longitudinal walls 38. Small plates or cross-pieces 28 each having a base which corresponds in shape to that of the grooves 20 are engaged in and retained within these latter; said cross-pieces are separated from each other and secured against translational motion by means of the partition elements 24 and two flat clamping plates such as the plate 30 which are secured to the casing 14 by means of screws 32. That portion of each cross-piece 28 which projects from the groove has a cross-section of progressively increasing width so as to delimit with the partition elements blind-end recesses 34 which have a rectangular base and decrease in width from the casing 14.

In order to ensure good heat conduction between the casing 14 on the one hand, the partition elements 24 and the cross-pieces 28 on the other hand, a tin bond is formed between these members, as will be explained hereinafter.

There is thus formed a metallic partition structure which is cooled by the fluid as this latter circulates within the conduit 16 of the casing. Each recess 34 of said partition structure is adapted to accommodate a brick 36 of zirconium oxide ceramic material, for example, said brick being imprisoned by the crosspieces which prevent it from being dislodged. The bricks are fabricated of ceramic material which has a high density and therefore low porosity, with the result that they cannot be impregnated with seeding material. Said bricks are usually prepared by sintering.

The height H, the length D of the bricks 36 and the thickness of the metallic partition structures are calculated in order to ensure a thermal flux corresponding to the thermal power injected into the MHD conversion duct while maintaining the frontal faces of the ceramic elements at a temperature which does not exceed 1,900–2,000° K. Without any limitation being implied, the values $D=15$ mm. and $H=12$ mm. can be adopted in the case of a thermal flux of 40 to 50 watts/cm.$^2$ when the ceramic material is zirconium oxide.

Thermal contact can be excellent between the high-density ceramic bricks 36 which are machined with high precision and the metallic cross pieces 28 which are machined with the same degree of precision. Thermal conduction can be improved still further by depositing interstitial and lamellar coatings made up of a film of silver.

The use of high-density sintered ceramics is made structurally possible by removing the limitation which, in the case of a constant thickness of ceramic material over the entire frontal face, would be imposed by the maximum thickness in the direction of the thermal flux. Thus, if the lateral dimension D of the brick is sufficiently small (D can be considered as the side if the base of the brick is square, the diameter if it is a circle, the centerline in the case of a hexagon, and so forth), then there is a substantial lateral removal of heat even starting from the surface layers of the frontal face, and without imposing any objectionable limitation on the depth H which can be substantial.

There is formed in the base of each ceramic element 36 a groove 37 in which is fitted a metallic element 41 having, for example, a triangular shape, the base of said element being anchored in the metallic casing 14 in which a groove 40 has been formed for this purpose. The metallic element 41 permits the flow of current from the frontal face of the electrode to the casing and is fabricated of a stainless refractory metal such as a platinum-rhodium alloy if the conductive ceramic material is a zirconium oxide to which are added either a rare-earth metal or a stainless steel or alloy if the ceramic material is a rare-earth chromite or formed of a mixture of zirconia and rare-earth chromites.

The assembly of the electrode is carried out in a very simple manner. In the casing which is fitted with one of the clamping plates 30, there is inserted in their respective grooves a first lateral wall 38, a series of cross-pieces 28 and metallic members 41, the corresponding bricks being then placed in position. Both bricks 36 and cross-pieces 28 are then secured in position by inserting a first partition element 24. A second row is then set in position and so on until the final introduction of the second lateral wall 38 and the second clamping plate 30. Prior to the positioning of the cross-pieces, particles of tin are deposited inside the dovetailed grooves; these particles melt in situ after assembly of the metallic partition elements and cross-pieces by heating the entire partition structure to 400° C. Similarly, a varnish conaining a suspension of silver is applied on the cross-pieces with a brush, the silver melts of its own accord during operation of the conversion duct and thus improves the contacts.

A noteworthy feature of the invention is the ease of disassembly of the structural unit which is constituted by the bricks 36, the cross-pieces 28, the metallic elements 41 and the partition elements 24 after an extended period of service and the ease with which new parts can be fitted in the place of the old, thereby permitting the reuse of the same casing 14.

Figure 3:
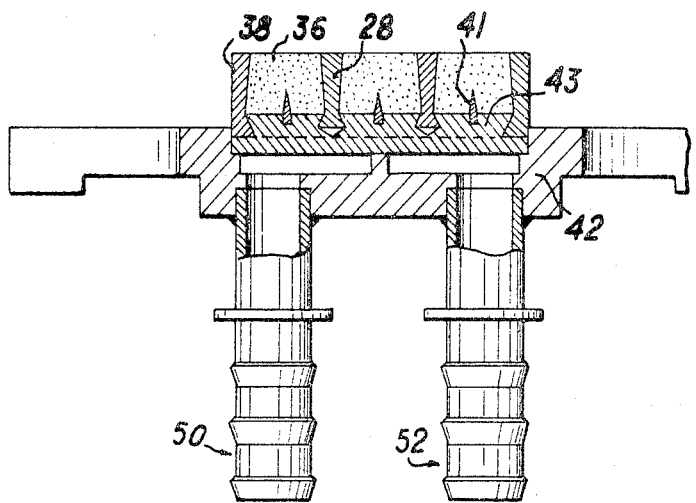
FIG. 3 is a view in elevation of an electrode, this view being a fragmentary cross section taken along the midplane.

FIG. 3 represents a transverse cross-section of a metallic casing which is made up of two components, namely a trough 42 in which are machined two rectangular recesses for the passage of cooling fluid which circulates from the connecting-nozzle 50 towards the connecting-nozzle 52, and a frame 43 which supports the partition structure and ceramic elements 36. These two components are secured to each other, for example by brazing.

Figure 4:
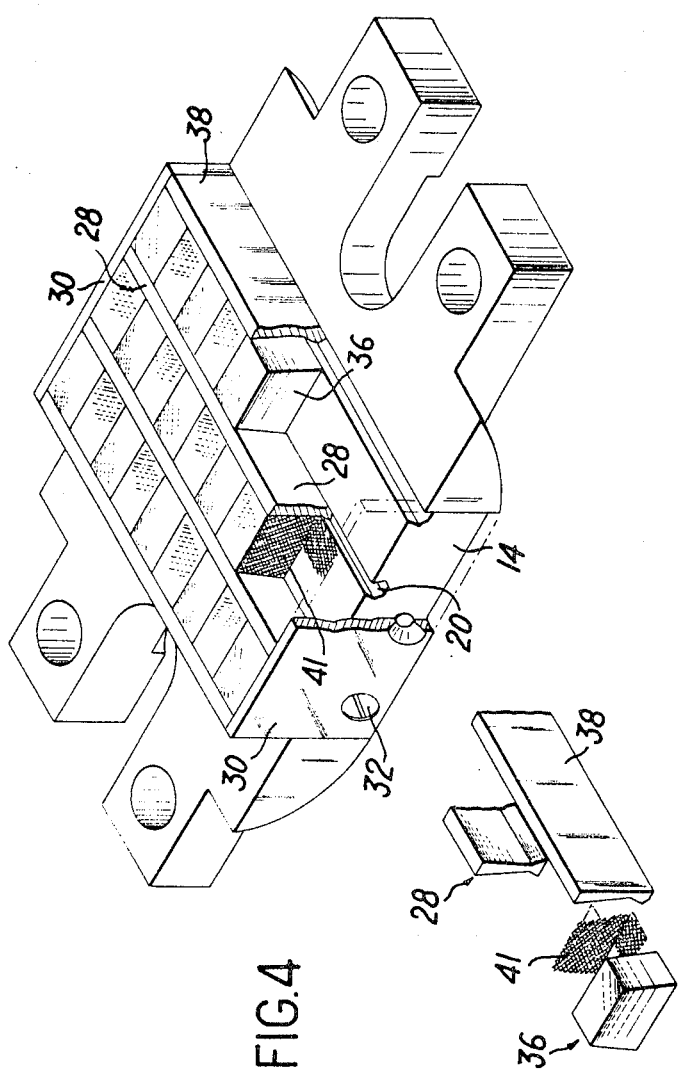
FIG. 4 is a partially exploded view in perspective showing an electrode according to an alternative form of the invention.

In the alternative form of construction shown in FIG. 4, the transverse partition structure of the electrode is dispensed with. The attachment of the ceramic elements 36 to the metallic casing is effected simply by means of the cross-pieces 28 which are slidably fitted in the grooves 20 and the clamping plates 30 which are secured to the casing 14 by means of the screws 32. In this embodiment, metallic grids such as the grid 41 serve to separate the ceramic elements both from each other and from the metallic casing. At the same time, said grids permit the flow of electric current from the frontal face of the electrode to the metallic casing and are formed, for example, of platinum-rhodium alloy or of a stainless steel, depending on the nature of the ceramic material employed.

It is apparent that the invention is not limited solely to the forms of construction which have been given herein by way of example and it must be understood that the scope of this patent extends to all alternative forms of either all or part of the arrangements described which remain within the definition of equivalent means.

What I claim is:

1. A composite electrode, comprising a casing formed of heat-conducting material which is maintained at low temperature and provided on one face with a partition structure forming recesses and bricks formed of ceramic material, said bricks being attached to said casing by means of metallic elements which permit the flow of electric current from the frontal face of said electrode to said casing.

2. An electrode in accordance with claim 1, the partition elements and cross-pieces which are separated by said partition structure comprising partition elements and cross-pieces which are separated by said partition elements and disposed at right angles thereto, said cross-pieces being anchored in the casing and having a cross-section of progressively increasing width towards the frontal face in order to retain the bricks.

3. An electrode in accordance with claim 1 the partition structure being made up of longitudinal partition elements formed by cross-pieces anchored in the casing and having a cross-section of progressively increasing width towards the frontal electrode face.

4. An electrode in accordance with claim 1, the cross-pieces being anchored in the casing by means of a dovetailed sliding assembly.

5. An electrode in accordance with claim 1, comprising metallic grids which separate the bricks both from each other and from the casing and permit the flow of electric current from the frontal electrode face to said casing.

6. An electrode in accordance with claim 1, the thermal contact between the ceramic bricks and the metallic elements being improved by depositing on the adjacent faces a suspension of silver in a varnish.

7. An electrode in accordance with claim 1, the thermal contact between metallic partition elements and cross-pieces and the cooled casing being improved by deposition of particles of tin which is melted by heating to 400° C.

References Cited

UNITED STATES PATENTS

| 3,135,208 | 6/1964 | Stuetzer | 313—311 |
| 3,149,247 | 9/1964 | Cobine | 313—346 X |
| 3,149,253 | 9/1964 | Luebke | 313—346 X |
| 3,274,408 | 9/1966 | Louis | 313—346 X |
| 3,311,762 | 3/1967 | Croitorus | 313—346 X |

JOHN W. HUCKERT, *Primary Examiner.*

A. J. JAMES, *Assistant Examiner.*

U.S. Cl. X.R.

313—311; 310—11